United States Patent [19]
Hermansen et al.

[11] Patent Number: 6,060,539
[45] Date of Patent: *May 9, 2000

[54] ROOM-TEMPERATURE STABLE, ONE-COMPONENT, THERMALLY-CONDUCTIVE, FLEXIBLE EPOXY ADHESIVES

[75] Inventors: Ralph D. Hermansen, Northridge; Steven E. Lau, Los Angeles, both of Calif.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/877,980

[22] Filed: Jun. 18, 1997

Related U.S. Application Data

[63] Continuation of application No. 08/504,168, Jul. 19, 1995, abandoned.

[51] Int. Cl.[7] .......................... C08G 59/40; C08G 59/20; C08K 3/22; C08K 3/28
[52] U.S. Cl. .......................... 523/400; 523/445; 523/457; 523/428
[58] Field of Search ................................. 523/457, 400, 523/428, 445

[56] References Cited

U.S. PATENT DOCUMENTS

| | | | |
|---|---|---|---|
| 3,759,914 | 9/1973 | Simms et al. | 523/400 |
| 3,996,175 | 12/1976 | Schreiber et al. | 523/457 |
| 4,714,648 | 12/1987 | Nagata . | |
| 4,833,226 | 5/1989 | Ishimura et al. | 528/45 |
| 4,866,108 | 9/1989 | Vachon et al. | 523/428 |
| 4,942,190 | 7/1990 | Murayama et al. . | |
| 5,367,006 | 11/1994 | Hermansen et al. | 523/466 |

FOREIGN PATENT DOCUMENTS

| | | |
|---|---|---|
| 0459614 | 12/1991 | European Pat. Off. . |
| 0561048 | 9/1993 | European Pat. Off. . |
| 0590975 | 4/1994 | European Pat. Off. . |

OTHER PUBLICATIONS

Lee et al. "Handbook of Epoxy Resins", McGraw–Hill Book Co., New York, pp. 5/32, 10/18, 16/11 (Reissue 1982).
Morrison & Boyd, "Organic Chemistry", Allyn and Bacon, Inc., Boston, p. 31, (1979).

*Primary Examiner*—Donald R. Wilson
*Attorney, Agent, or Firm*—Colin M. Raufer; Leonard A. Alkov; Glenn H. Lenzen, Jr.

[57] ABSTRACT

A flexible thermally-conductive epoxy-based adhesive composition and method for making the same are provided. The present adhesive composition comprises (a) a polymer mixture comprising at least one polyepoxide resin having a hardness not exceeding a durometer Shore D reading of about 45, when cured with a stoichiometric amount of diethylene triamine ("DETA"), and a substantially stoichiometric amount of at least one latent epoxy resin curing agent; and (b) a thermally-conductive filler. Optional components include secondary epoxy resins, non-reactive flexibilizers, diluents, and processing aids. The present adhesive composition is rheologically stable for weeks or even months at room temperature and is curable in less than one hour at a temperature ranging from about 100° C. to 140° C., whereupon the cured adhesive composition exhibits a durometer Shore A of less than about 90 and a thermal conductivity exceeding 0.4 BTU/hr-ft-° F. (0.7 W/m-K).

4 Claims, No Drawings

ROOM-TEMPERATURE STABLE, ONE-COMPONENT, THERMALLY-CONDUCTIVE, FLEXIBLE EPOXY ADHESIVES

CROSS-REFERENCE TO RELATED APPLICATIONS

This is a continuation-in-part application Ser. No. 08/504,168 filed Jul. 19, 1995 now abandoned.

The present application is related to applications having Ser. Nos. 08/504,002, U.S. Pat. 5,575,956, and 08/504,105 now abandoned, both filed on even date herewith and Respectively entitled "Room-Temperature Stable, One-Component, Electrically-Conductive, Flexible Epoxy Adhesives" and "Room-Temperature Stable, One-Component, Flexible Epoxy Adhesives".

TECHNICAL FIELD

The present invention relates generally to compositions used as adhesives. More particularly, the present invention relates to flexible epoxy compositions for use as thermally-conductive adhesives, which are designed to be stable at room temperature.

BACKGROUND ART

The flexible polymer market offers a wide variety of adhesive polymers, including such compounds as polyurethanes, polysulfides, silicones, and epoxy compounds. In particular, epoxy compounds demonstrate the ability to strongly adhere to a variety of materials, including metal, glass, plastic, wood, and fiber, and consequently are often used to bond dissimilar materials. Further, epoxy compounds are known to exhibit excellent resistance to attack by many corrosive chemicals. Despite heir ability to bond dissimilar materials, commercially-available epoxy compounds lack certain properties necessary for use as thermally-conductive adhesives in automated bonding processes.

In the electronics industry, thermally-conductive adhesives serve the dual purposes of bonding materials together and transferring heat from electronics components to PWB's and heat sinks. By dissipating heat generated in the operation of electronic devices, thermally-conductive adhesives increase the life of electronic components. A thermally-conductive adhesive must exhibit high thermal conductivity, high volume resistivity, and good dielectric properties to effect the dissipation of heat. However, to be filly utilized by industry in automated bonding processes, a thermally-conductive adhesive must also be convenient to store and readily curable to form sufficiently flexible bonds. Presently, epoxy-based adhesives are available in two forms, namely two component systems or one-component systems, neither of which is both convenient to store and readily curable.

Two-component epoxy-based adhesives are readily curable at room temperature but are inconvenient to use and store. The components of two-component systems must be accurately measured and properly mixed just prior to use. Thus, the various components to be mixed must be separately stored until use, and production, workers are charged with the added responsibility of preparing epoxy-based adhesives having uniform properties. Not surprisingly, two-component epoxy-based adhesives are not favored.

One-component epoxy-based adhesives are available for industrial application in two basic forms: rigid epoxy adhesives and frozen pre-mix, flexible epoxy adhesives. Rigid epoxy adhesives include such compounds as Bisphenol-A epoxy adhesives and novolacs. These rigid epoxy adhesives exhibit strong adhesion for many materials and may be conveniently stored at room temperature. However, these adhesives form brittle bonds that are often insufficiently pliant for bonding dissimilar materials. For example, a brittle bond between dissimilar materials with different thermal expansion rates may be unable to withstand the stresses caused by the thermal mismatch, ;so that both the bond and its adherends may be susceptible to failure.

Frozen pre-mix, flexible epoxy adhesives are also employed by industry, although the usage of such adhesives is far surpassed by the usage of rigid epoxy adhesives. A description of frozen pre-mix, flexible epoxy adhesives is found in U.S. Pat. No. 4,866,108, assigned to the present assignee, which discloses and claims the composition behind Flexipoxy 100 Adhesive, a frozen flexible epoxy adhesive developed for spacecraft electronic applications. In comparison to rigid epoxy adhesives, flexible epoxy adhesives form more pliable bonds that are capable of successfully adapting to stresses between dissimilar materials caused by differing rates of expansion. However, in contrast to rigid epoxy adhesives, frozen pre-mix flexible epoxy adhesives must be stored in a frozen state and must be thawed prior to use. Moreover, frozen adhesives offer a limited working life of only about 2 to 8 hours once thawed, whereas at least one week of working life is realistically required for general automated bonding operations. Therefore, frozen pre-mix, flexible epoxy adhesives are widely considered impractical for use in high volume automated processing given the scheduling difficulties wrought by both the need to thaw the adhesives as well as the limited working life available after thawing.

Thus, a need remains for a one-component thermally-conductive epoxy adhesive that offers the convenience of room temperature storage and low temperature, rapid curing while also providing pliable bonds capable of withstanding the rigors of varying expansion rates between bonded materials. This need is particularly acute for high volume automated bonding operations, which can tolerate neither frequent periods of downtime for thawing nor the expense of discarding adhesives that quickly become ineffective. This need must be achieved without sacrificing good adhesion characteristics.

DISCLOSURE OF INVENTION

In accordance with the present invention, epoxy adhesive compositions are provided which are thermally-conductive, storable at room temperature, produce non-brittle, flexible bonds, exhibit strong adhesion, and have good processing characteristics.

Further, the present compositions may be readily cured at temperatures ranging from about 100° C. to 140° C. in less than one hour. Accordingly, these compositions possess most, if not all, of the advantages of the above prior art compositions while overcoming their above-mentioned significant disadvantages.

The room-temperature stable, one-component, flexible epoxy-based adhesive compositions of the present invention comprise:

(a) a polymer mixture comprising
  (i) at least one polyepoxide resin having a hardness not exceeding a durometer Shore D reading of about 45 when cured with a stoichiometric amount of diethylene triamine ("DETA"), and
  (ii) a substantially stoichiometric amount of at least one latent epoxy resin curing agent; and (b) a thermally-conductive filler, wherein the adhesive composition, upon cure, exhibits a durometer Shore A of less than 90 and a thermal conductivity exceeding 0.4 BTU/hr-ft-° F. (0.7 watt/m-K).

The polyepoxide resin component of the present compositions is a flexible epoxy resin. Flexible epoxy resins are defined herein to be those epoxy resins having a durometer Shore D measurement of 45 or less when cured with DETA In comparison, semi-flexible epoxy resins are defined to be those epoxy resins having a durometer Shore D value ranging from about 45 to 75 when cured with DETA and rigid epoxy resins are defined as epoxy resins having a Shore D value exceeding about 75 when cured with DETA.

The epoxy resin curing agent employed to cure the epoxy resin is a latent curative. As such, there is no reaction between the curing agent and the epoxy resin component at room temperature. Rather, the epoxy resin component is cured in the presence of the curing agent upon exposure to elevated temperatures. The present combination of epoxy resin, latent epoxy resin curing agent, and filler remains uncured arid rheologically stable at room temperature for weeks or even months, thus providing a long storage life conducive to automated bonding operations.

Aside from epoxy resin, latent curing agent, and filler components, other components that may be optionally added to the present adhesive compositions include flexibilizers, diluents, and processing additives such as antioxidants.

The present adhesive compositions are prepared by first mixing the following components to form a thoroughly wetted mass: (1) liquid components comprising the epoxy resin component, and optionally, flexibilizers and diluents; and (2) solid components comprising the latent epoxy resin curing agent, the filler, and optionally, processing additives. The thoroughly wetted mass is then reacted at a temperature ranging from about 100° C. to 175° C. to form the present cured flexible epoxy adhesives, although the composition is designed to cure at a relatively low temperature, ranging from about 100° C. to 140° C. in less than one hour.

In sum, the adhesive of the present invention is novel in providing an epoxy-based thermally-conductive composition that is Theologically stable for weeks as a single component mixture at room temperature, curable at low temperatures (ranging from about 100° C. to 140° C.) in less than one hour, and flexible upon curing. Thus, the present adhesives offer the best features of the prior art adhesives. Like the frozen, pre-mix, flexible epoxy adhesives, the present adhesives form pliant bonds that withstand the stresses of thermal mismatch. Like the rigid epoxy adhesives, the present compositions may be conveniently stored at room temperature and easily processed. The ability of the present adhesives to provide strong, flexible, thermally-conductive bonds without wreaking havoc on production schedules effectively promotes epoxy-based adhesives to use in automated bonding processes. In short, these adhesives enable industry to avail itself of the excellent adhesive qualities associated with epoxy compounds without sacrificing the advantages of automation. Importantly, the compositions of the present invention offer these benefits without employing solvent components, so that environmental integrity is maintained.

DETAILED DESCRIPTION OF THE PREFERRED EMBODIMENTS

The adhesive compositions of the present invention have been developed to provide industry with the ability to store epoxy-based adhesives at room temperature, as well as to provide good adhesion qualities, thermal conductivity, flexibility, and ease of processing. More particularly, the present adhesive compositions exhibit thermal conductivity in excess of 0.4 BTU/hr-ft-° F. (0.7 watt/m-K), volume resistivity greater than $10^{12}$ ohm-cm at room temperature and $10^{10}$ ohm-cm at 200° F. (93° C.), and increased flexibility measured as less than 90 Shore A durometer, all while being curable in less than one hour at a temperature ranging from about 100° C. to 140° C.

The compositions of the present invention are based on the use of a combination of selected epoxy resins, a curing agent, and a filler which will provide a flexible, thermally-conductive product that is storable at room temperature in an uncured state. The selection of the particular epoxy resins and the curing agent is critical in obtaining the desired flexibility in the final adhesive product.

The compositions of the present invention employ at least one polyepoxide resin falling within the class of so-called "flexible epoxy resins". The phrase "flexible epoxy resin" is intended to encompass epoxy resins having a durometer Shore D reading not exceeding 45 when cured with diethylene triamine ("DETA"). The internal flexibility exhibited by suitably flexible polyepoxide resins derives from such features is long aliphatic chains, ether and ester linkages in the polymer chains, and double carbon-carbon bonds, which increase flexibility by enhancing the rotation of adjacent single carbon-carbon bonds.

The polyepoxide resin or blend of polyepoxide resins; employed in the practice of the invention are preferably selected from the group consisting of the trifunctional novolac epoxy of cardanol and the difunctional epoxy of cardanol. The internal flexibility exhibited by these two epoxy resins primarily derives from their long aliphatic chains and pendant aliphatic chains. The trifunctional novolac epoxy of cardanol, with an epoxy equivalent weight of about 600, and the difunctional epoxy of cardanol, with an epoxy equivalent weight of about 350, are commercially available from the Cardolite Corp. of Newark, N.J. under the respective trade designations of NC-547 and NC-514.

The compositions of the present invention may optionally employ secondary resins to enhance certain properties of the adhesive composition, such as flexibility and lap shear strength. For example, an aliphatic polyepoxide such as the diglycidyl ester of linoleic dimer acid available from Shell Chemical Co. of Houston, Tex., under the trade designation Epon 871 may serve as a secondary resin to enhance the flexibility and elongation properties of the adhesive composition. Other secondary resins which may be employed in the practice of the invention include the diglycidyl ether of polyoxypropylene glycol, which has an epoxy equivalent weight of about 320 and is commercially available from Dow Chemical of Midland, Mich. under the trade designation DER 732. The diglycidyl ether of polybutadiene may also be employed as a secondary resin and is commercially available from Nagase Chemical of Tokyo, Japan under the trade designations Denalex R45EPT and Denalex R15EPT (although these latter two secondary resins are not currently allowed in the United States).

While secondary resins are useful as modifiers, they do not offer the degree of compatibility with latent curatives or the volume resistivity necessary to serve as primary resins in the present adhesive compositions. Moreover, the addition of secondary resins adversely affects the hydrolytic stability of the adhesive compositions. The maximum allowable concentration of secondary resin will vary according to the composition of the adhesive; however, as a general rule, the amount of secondary epoxy resin present in the adhesive composition should not exceed about 40 wt% of the epoxy resin component.

The curing agents used in the present compositions are chosen to provide a flexible product from the selected epoxy resins. The present curing agents are characterized by long aliphatic moieties in their structure which allow compatibility with the selected resins at cure temperature. The present curing agents are further characterized as "latent" curatives. A latent curative is one that does not operate to cure an epoxy resin until melted in the elevated temperatures of a curing process while in contact with the targeted epoxy resin. Additionally, curing agents preferably employed in the practice of the invention should have two or more active hydrogen atoms per molecule, have a melting point or softening point between about 60° C. and 150° C., and should be available as finely-divided powders.

Examples of curing agents that may be suitably employed in the practice of the invention to achieve flexible epoxy adhesives (in view of the selected classes of epoxy resins, the selected cure temperatures ranging from about 100° C. to 140° C., and the selected cure time of less than one hour) include the following two groups of compounds:

(1) Dihydrazide curing agents, most notably the following:

(a) aliphatic dihydrazide with Diuron accelerator (3-(3,4-dichlorophenyl)-1,1-dimethyl urea), having an active hydrogen equivalent weight of 134 as available under the trade designations Ajicure AH-122 and Ajicure AH-123 from Ajinomoto Co., Inc., of Teaneck, N.J.

(b) icosanedioic acid dihydrazide ($C_{20}H_{42}N_4$ $_{O2}$), having an active hydrogen equivalent weight of 92.5 as available from Ajinomoto Co., Inc. under the trade designation LDK, with about 10% of the compound as sold being hexadecanedioic acid dihydrazide according to the Ajinomoto material safety data sheet, and (c) 7,11-octadecadiene-1,8-dicarboxylic acid dihydrazide ($C_{20}H_{38}N_4$ $_{O2}$), having an active hydrogen equivalent weight of 91.5 as available from Ajinomoto Co., Inc., under the trade designation UDH; and (2) Alternative curing agents, most notably the following:

(a) the polyamine adduct of epoxy resin, commercially available from Air Products, Allentown, Pa., under the trade designation Ancamine 2014, and (b) epoxy-amine adducts such as commercially available from Ajinomoto Co., Inc. under the trade designations Ajicure PN-23 and MY-24.

The amount of latent curing agent is preferably in stoichiometric proportion relative to the epoxy resin employed. In general, the amount of curing agent may be varied about ±15 percent from stoichiometry, with little adverse effect on the final product. The severity of adverse affects deriving from employing more or less than the exact stoichiometric amount of curing agent depends upon the functionality of the ingredients employed (e.g., trifunctional epoxy resins fare better than difunctional (epoxy resins) and the cure temperatures employed (e.g., resins cured at higher temperatures fare better than those cured at lower temperatures).

The latent epoxy curing agents employed in the present compositions are commercially available as solid powders. Given that other components such as the filler are also in particulate form, the volume used by the particulate curing agent should be minimized so that other particulate components have adequate space within the adhesive composition to serve their intended functions. As such, it is preferable that the resin:curative volume ratio be maximized to allow the fillers and other solid components to perform their intended functions at optimally minimal concentrations. The epoxy resins and curing agents selected for use in the practice of the present invention reflect an attempt to maximize the resin:curative volume ratio whereby the epoxy resins have as high an epoxy equivalent weight as possible while the curing agents have as low an equivalent weight as possible. Thus, the present adhesive compositions maximize the resin:curative volume ratio while maintaining substantially stoichiometric proportions.

The filler component serves to render the present adhesive compositions thermally conductive. As such, there is a positive correlation between the amount of filler and the degree of thermal conductivity achieved by a particular adhesive composition. The amount of filler should range from about 35 to 75 vol % of the total components of the adhesive composition. With less than 35 vol% filler, the adhesive composition fails to exhibit the desired thermal conductivity of at least 0.4 BUT/hr-ft-° F. (C).7 watt/m-K) and volume resistivity of at least $10^{12}$ ohm-cm at room temperature and $10^{10}$ ohm-cm at 200° F. (93° C.). However, with more than 75 vol% filler, the adhesive composition fails to exhibit the necessary lap shear strength for bonding. Preferably, the filler should represent about 50 vol% of the total adhesive composition.

The filler component may comprise any of the well-known thermally conductive fillers, such as aluminum nitride, aluminum oxide, boron nitride, silicon carbide, and similar inorganic and mineral compounds. In general, the filler should have a significantly higher volume resistivity and thermal conductivity than the polymer mixture comprising the epoxy resin and the curing agent. Preferably, aluminum oxide is employed as the filler, which by itself has a thermal conductivity of about 20 BTU/hr-ft-° F. (35 watts/m-K).

The particle size of the filler material should be considered in formulating the present adhesive compositions. As discussed regarding the selection of curing agents, the filler and curing agents are both solids and therefore compete for space within the adhesive composition. In addition to maximizing the resin:curative volume ratio, this potential overcrowding problem can also be overcome by selecting different particle sizes for curing agent and filler such that the smaller particle fits into the interstices between the larger particles. For example, if the filler for a thermally-conductive adhesive consists of 50 μm spheres, a curing agent consisting of particles less than 6 μm in diameter could fit into the interstices of the filler particles. In the practice of the intention, the filler particle size preferably correlates to the standard 325-mesh sieve size such that the largest filler particles measure approximately 44 μm and allow curing agents of less than about 11 μm to fit within the filler interstices.

Optionally, the composition of the present invention may include non-reactive flexibilizers, preferably not exceeding 50 wt% of the total liquids in the adhesive, which include the epoxy resins and the flexibilizers. In general, non-reactive flexibilizers serve to enhance the flexibility and reworkability of the final adhesive composition. Non-reactive flexibilizers act as external plasticizers which do not chemically attach to the polymer network but are retained in the network due to van der Waals attraction and/or hydrogen bonding. Consequently, they must have a chemical structure compatible with the epoxy/curative structure in order not to be expelled. Plasticizers with high molecular weight are desirable, since the increased chain entanglement between plasticizer and the epoxy/curative structure serves to decrease migration of the plasticizer. Simple experimentation to determine compatible plasticizers, such as by preparing a polymer and proposed plasticizer and observing whether compatibility (exists, may be done. Such experimentation is considered to be a routine endeavor that is well within the capabilities of those having ordinary skill in the art and is not considered to be undue. Polyols having molecular weights of at least 1,000 and triols with molecular weights ranging from 1,500 to 6,000 are commonly employed as non-reactive plasticizers. Examples of high molecular weight triols suitably employed in the practice of the invention are high molecular weight poly(oxypropylene) triol (available from Union Carbide, Danbury, Conn., under the trade designation LHT-28) and hydroxyl-terminated polybutadiene (available from Atochem, under the trade designation Poly BD R45HT), with the latter being the flexibilizer of preference in the practice of the present invention. Other examples of suitable non-reactive flexibilizers include phthalate esters, adipate esters, and methyl lineolate.

The adhesive composition may also optionally include a diluent component. The diluent may comprise any monofunctional material (i.e., having one active hydrogen per molecule) that reduces viscosity. The diluent may comprise any of the well-known materials for this purpose, such as monoepoxides and secondary amines. Simple experimentation will readily determine the appropriate amount of diluent in the adhesive composition. The scope of experimentation required to determine the proper concentration of diluent is considered to be reasonable for those having ordinary skill in the art and is not considered to be undue.

Other optional additives to the flexible epoxy adhesive composition include UV stabilizers, antioxidants and various other processing aid, such as wetting agents, antifoaming agents, and dispersing agents, all of which are known and commonly used in the art. The processing aids are preferably employed at a concentration of up to 5 wt % of the total adhesive composition.

One novel feature of the invention is that the uncured combination of epoxy resins, latent curing agent, and filler is stable at room temperature. More specifically, the uncured combination is rheologically stable at room temperature so that it does not cure at room temperature and is stable in terms of viscosity. Thus, unlike frozen, pre-mix flexible epoxy compounds, the present compositions do not require thawing prior to curing and, as such, are available for curing on an as-needed basis. The combination is readily cured at temperatures ranging from about 100° to 140° C. in less than one hour. Upon cure, the present compositions remain flexible and reworkable, with a Durometer Shore A of less than 90. Another novel feature of the present composition is that its flexibility extends to as low as –50° C., as measured by glass transition temperature $T_g$. Finally, the present adhesive compositions exhibit thermal conductivities in excess of 0.4 BTU/hr-ft-° F. (0.7 watt/m-K) and volume resistivities in excess of $10^{12}$ ohm-cm at room temperature and $10^{10}$ ohm-cm at 200° F. (93° C.). Thus, the present adhesive compositions provide flexible, strong bonds that serve to dissipate heat in electronic devices and to take up thermal stresses while being conducive to automated bonding operations by virtue of their room-temperature stability and ready curability.

The adhesive of the present invention is formulated by mixing the liquid components (namely, the epoxy resins, flexibilizers, and diluents) with the dry ingredients (namely, the curing agents, fillers, and processing aids) in their appropriate concentrations until the dry ingredients are thoroughly wetted. Preferably, the dry ingredients are milled into the liquid ingredients, for example, using a 3-roll mill. Milling achieves a good blend of resin and curative so that the resulting adhesive is uniform in composition and therefore exhibits higher overall quality. Once the dry ingredients are thoroughly wetted, air is removed from the adhesive mixture by further mixing it under a vacuum. The resulting uncured composition may be stored at room temperature for several weeks or even months.

When the mixture comprising the present composition is to be used as an adhesive, the mixture must be cured. First, the mixture is placed in contact with the materials to be bonded in the manner desired for adhesion. Then, the mixture is cured by heating both the materials to be bonded and the inserted mixture to an elevated cure temperature. While a cure temperature as high as 175° C. may be employed depending upon the particular electronics application, the present adhesive compositions a:,e designed to cure at a temperature ranging from about 100° C. to 140° C. The minimum curing temperature varies by formulation, but below a certain temperature the mixture will not properly cure. While cure times vary with the melting point and molecular weight of the curing agent, the cure time for the adhesives of the present invention does not exceed about 1 hour. It is contemplated that in most cases the cure time need only be approximately 30 minutes. Upon cure, the present adhesive composition forms a strong, flexible bond between the materials that remains flexible down to a glass transition temperature $T_g$ as low as –50° C., with the precise minimum $T_g$ depending on the formulation of the adhesive.

EXAMPLES

Examples 1–4 represent adhesive compositions prepared in accordance with the present invention, with the formulations of Examples 1–4 reported in Table I below. In each example, the polymer mixture represented about 30 parts by weight (pbw) of the adhesive composition while the alumina filler represented 70 pbw of the composition. The polymer mixture in each case included a blend of Cardolite NC-547 resin and Cardolite NC-514 resin. The alumina filler employed in each example was 325-mesh.

The adhesive compositions of Examples 1–4 were formulated by mixing the liquid epoxy resins with the solid curing agents and fillers until the dry ingredients were thoroughly wetted and blended. In each case, the blended mixture was cured after exposure to a temperature of about 120° C.

Table I below lists various properties observed for the cured adhesive compositions of Examples 1–4 . More particularly, the thermal conductivity, volume resistivity, dielectric strength, durometer hardness values, and lap shear strength of each example are reported.

The thermal conductivity measurements were conducted in accordance with the standard set forth by the American Society for Test and Materials ("ASTM") in ASTM C177. The volume resistivity measurements were performed in accordance with ASTM D257. Dielectric strengths were measured in accordance with AS'RM D149, while Shore-A and Shore-D durometer tests were performed on the cured adhesive compositions as specified in "Indentation Hardness of Rubber and Plastics by Means of a Durometer" of ASTM D2240. Finally, tests for lap shear strength were performed as specified by ASTM D 1002.

For comparison, Examples 5–8 represent formulations outside the scope of the present invention. Each of these formulations failed to meet one or more requirements of the present invention, as illustrated in Table II.

TABLE I

TEST RESULTS WITHIN SCOPE OF INVENTION

| Example Number | Formulation | Conductivity, BTU/hr-ft-° F. (W/m-K) | Volume Resistivity, ohm-cm | Dielectric Strength, V/mil (V/cm)[1] | Durometer Hardness | Lap Shear Strength, Alum-Alum, psi (kg/cm$^2$) |
|---|---|---|---|---|---|---|
| 1 | 12 pbw Cardolite NC-547 resin<br>6 pbw Cardolite NC-514 resin<br>6 pbw Epon 871 resin<br>6 pbw Ajicure AH-122 curative<br>70 pbw 325-mesh alumina filler | 0.42 (0.74) | $5 \times 10^{12}$ @ 23° C.<br>$2.3 \times 10^{10}$ @ 93° C. | 350<br>($1.38 \times 10^5$) | 79 Shore A<br>38 Shore D | 820 (58) |
| 2 | 13.5 pbw CardoliteNC-547 resin<br>6.75 pbw CardoliteNC-514<br>6.75 pbw Epon 871 resin<br>3 pbw Ajicure PN-23 curative<br>70 pbw 325-mesh alumina filler | 0.43 (0.75) | $6 \times 10^{13}$ @ 23° C.<br>$9.8 \times 10^{10}$ @ 93° C. | 550<br>($2.17 \times 10^5$) | 86 Shore A<br>44 Shore D | 890 (63) |
| 3 | 13.5 pbw Cardolite NC-547 resin<br>6.75 pbw Cardolite NC-514<br>6.75 pbw Epon 871 resin<br>3 pbw Ancamine 2014FG curative<br>70 pbw 325-mesh alumina tiller | 0.43 (0.75) | $1 \times 10^{13}$ @ 23° C.<br>$2 \times 10^{10}$ @ 93° C. | 465<br>($1.83 \times 10^5$) | 85 Shore A<br>43 Shore D | 850 (60) |
| 4 | 11.5 pbw Cardolite NC-547 resin<br>11.5 pbw Cardolite NC-514 resin<br>7 pbw Ajicure AH-122 curative<br>70 pbw 325-mesh alumina filler | 0.44 (0.77) | $6 \times 10^{12}$ @ 23° C.<br>$3 \times 10^{10}$ @ 93° C. | 450<br>($1.77 \times 10^5$) | 88 Shore A<br>47 Shore D | 950 (67) |

[1] 60 Hz RMS

TABLE II

TEST RESULTS OUTSIDE SCOPE OF INVENTION

| Example Number | Formulation | Thermal Conductivity, BTU/hr-ft-° F. (W/m-K) | Volume Resistivity, ohm-cm | Dielectric Strength, V/mil (V/cm)[1] | Durometer Hardness | Lap Shear Strength, Alum-Alum, psi (kg/cm$^2$) |
|---|---|---|---|---|---|---|
| 5 | 15.5 pbw Cardolite NC-547 resin<br>7.8 pbw Cardolite NC-514 resin<br>7.8 pbw Epon 871 resin<br>8.9 pbw Ajicure AH-122 curative<br>60 pbw 325-mesh alumina filler | 0.32 (0.56)<br>Thermal Conductivity is Too Low | $4.4 \times 10^{12}$ @ 23° C.<br>$1.9 \times 10^{12}$ @ 23° C. | 330<br>($1.30 \times 10^5$) | 77 Shore A<br>35 Shore D | 890 (63) |
| 6 | 18 pbw Cardolite NC-547 resin<br>18 pbw Epon 871 resin<br>4 pbw Ajicure PN-23 curative<br>60 pbw 325-mesh alumina filler | 0.31 (0.54)<br>Thermal Conductivity is Too Low | $1.5 \times 10^{12}$ @ 23° C.<br>$8 \times 10^9$ @ p3° C.<br>Volume Resistivity is Too Low | 350<br>($1.38 \times 10^5$) | 76 Shore A<br>35 Shore D | 750 (53) |
| 7 | 11 pbw Cardolite NC-514 resin<br>11 pbw DER 732 resin<br>8 pbw Ajicure AH-122 curative<br>70 pbw 325-mesh alumina filler | 0.42 (0.74) | $8 \times 10^{11}$ @ 23° C.<br>$5 \times 10^9$ @ 93° C.<br>Volume Resistivity is Too Low | 320<br>($1.26 \times 10^5$) | 72 Shore A<br>30 Shore D | 450 (32) |
| 8 | 15 pbw Epon 871 resin<br>15 pbw DER 732 resin<br>10 pbw Ajicure AH-122 curative<br>60 pbw 325-mesh alumina flller | 0.32 (0.56)<br>Thermal Conductivity is Too Low | $6 \times 10^{11}$ @ 23° C.<br>$3 \times 10^9$ @ 93° C.<br>Volume Resistivity is Too Low | 290<br>($1.14 \times 10^5$) | 72 Shore A<br>30 Shore D | 350 (25) |

[1] 60 Hz RMS

Thus, the formulations of Examples 1–4 performed in accordance with the invention. Their thermal conductivities each exceeded 0.4 BTU/hr-ft-° F. (0.7 watt/m-K), their volume resistivities each exceeded $10^{12}$ ohm-cm at room temperature and $10^{10}$ ohm-cm @200° F. (93° C.), and their durometer hardness values were each less than 90 Shore A. Further, their dielectric strength and lap shear strength values were within acceptable ranges to serve as thermally-conductive adhesives.

In comparison, the formulations of Examples 5–8 failed to meet at least one of the objectives of the present invention. The formulation of Example 5 exhibited insufficient thermal conductivity of less than 0.4 BTU/hr-ft-°F.(0.7 watt/m-k) deriving from too little alumina filler in relation to the total adhesive composition. The formulation of Example 6 exhibited insufficient thermal conductivity and volume resistivity deriving from its excessive use of the secondary resin Epon 871 as well as insufficient use of alumina filler. The formulation of Example 7 exhibited insufficient volume resistivity given its excessive use of the secondary resin DER 732. Finally, the adhesive formulation of Example 8 exhibited both insufficient thermal conductivity and volume resistivity given its excessive use of the secondary resin DER 732 and its insufficient alumina filler concentration.

Thus, it has been demonstrated that adhesive compositions formulated in accordance with the present invention are thermally-conductive, curable at relatively low temperatures (ranging from about 100° to 140° C.) in less than two hours, and flexible upon curing, having a durometer Shore A of less than 90 at room temperature. Furthermore, the present adhesive compositions exhibit the lap shear strength necessary to provide sufficiently strong bonds in an industrial setting.

INDUSTRIAL APPLICABILITY

The cured adhesives of the invention are thermally-conductive while being flexible across wide ranges of temperatures. Further, the uncured adhesives of the invention are rheologically stable at room temperature for time periods measured in months. Given these qualities, the thermally-conductive adhesives of the invention may be successfully employed in numerous industrial applications requiring automated bonding of dissimilar materials, including the manufacture of such products as automobiles, motorhomes, aircraft, boats, and manufactured homes.

Thus, there has been disclosed a composition and a method for making a thermally- conductive, flexible epoxy adhesive that is storable in its uncured state at room temperature. It will be readily apparent to those of ordinary skill in this art that various changes and modifications of an obvious nature may be made, and all such changes and modifications are considered to fall within the scope of the invention, as defined by the appended claims.

What is claimed is:

1. A flexible thermally-conductive epoxy adhesive composition comprising a combination of the following components:
    (a) a polymer mixture comprising
        (i) at least one polyepoxide resin having a hardness not exceeding a durometer Shore D reading of about 45 when cured with a stoichiometric amount of diethylene triamine ("DETA") and being selected from the group consisting of the trifunctional novolac epoxy of cardanol, the difunctional epoxy of cardanol, and mixtures thereof and
        (ii) a substantially stoichiometric amount of a latent epoxy resin curing agent selected from the group consisting of an aliphatic dihydrazide optionally further comprising an accelerator, a polyamine adduct of epoxy resin, and epoxy-amine adducts wherein said latent epoxy resin curing agent has long aliphatic moieties in its structure, has two or more active hydrogen atoms per molecule, is a solid, and has a melting point or softening point between about 60° and 150° C.; and
    (b) a thermally-conductive filler,
    wherein said flexible thermally-conductive epoxy adhesive composition is rheologically stable at room temperature and, upon cure, exhibits a durometer Shore A of less than about 90 and a thermal conductivity exceeding 0.4 BTU/hr-ft-° F. (0.7 W/m-K).

2. The flexible thermally-conductive epoxy adhesive composition of claim 1 wherein said at least one thermally-conductive filler is selected from the group consisting of aluminum nitride, aluminum oxide, boron nitride, and silicon carbide.

3. The flexible thermally-conductive epoxy adhesive composition of claim 2 wherein said at least one thermally-conductive filler comprises aluminum oxide.

4. The flexible thermally-conductive epoxy adhesive composition of claim 1 wherein said at least one thermally-conductive filler is present at a concentration ranging from about 35 to 75 vol % of said flexible thermally-conductive epoxy adhesive composition.

* * * * *